United States Patent [19]
Hollins

[11] 3,821,996
[45] July 2, 1974

[54] APPARATUS FOR HINDERING THE THEFT OF A STORAGE BATTERY FROM A MOTOR VEHICLE

[76] Inventor: Jesse R. Hollins, 1 Chester Dr., Great Neck, N.Y. 11021

[22] Filed: Apr. 27, 1972

[21] Appl. No.: 248,025

[52] U.S. Cl............ 180/68.5, 224/42.32, 224/42.4, 248/361 R
[51] Int. Cl. ........................................ B60r 18/02
[58] Field of Search.......... 180/68.5, 65; 248/361 R; 224/42.4, 42.32

[56] References Cited
UNITED STATES PATENTS
1,480,831   1/1924   Murphey..................... 224/42.32 X
2,104,457   1/1938   Galamb........................... 180/68.5

FOREIGN PATENTS OR APPLICATIONS
1,192,717   5/1965   Germany ........................... 180/68.5

Primary Examiner—David Schonberg
Assistant Examiner—Milton L. Smith

[57] ABSTRACT

A storage battery housing for hindering the theft of a storage battery from a motor vehicle. The battery housing is provided with means for securing the storage battery housing to a vehicle mounting structure in such a manner that the storage battery cannot be detached from the mounting structure which extends from the vehicle frame unless the vehicle is lifted up a sufficient distance from the ground so that a person can fit under the vehicle and disassemble the securing means from the underside of the vehicle.

4 Claims, 7 Drawing Figures

APPARATUS FOR HINDERING THE THEFT OF A STORAGE BATTERY FROM A MOTOR VEHICLE

BACKGROUND OF THE INVENTION

1. Field of the Invention

This invention relates to an apparatus for preventing storage batteries from being easily unfastened and removed from a motor vehicle.

2. Description of the Prior Art

Most motor vehicles presently in use are not equipped with motor compartment hood locks or alarm systems. Thus, a storage battery, which is placed under the hood near the motor, can easily be stolen, since in most instances, the storage battery is placed in a receptacle using a bracket and a standard nut and bolt arrangement to hold the battery in place. Since this bracket and nut and bolt arrangement is easily accessible when the hood of the motor vehicle is lifted up, the bracket can easily be removed, and after the battery cables are disconnected from the terminals of the battery, the battery is ready to be removed from the receptacle.

SUMMARY OF THE INVENTION

1. Purposes of the Invention

It is therefore an object of this invention to prevent the easy theft and removal of storage batteries from motor vehicles;

It is another object of this invention to provide a new technique of securing a storage battery to the mounting structure of a motor vehicle in a manner such that the securing means are not readily accessible.

Other objects of the invention will in part be obvious and in part be pointed out hereinafter.

2. Brief Description of the Invention

According to a broad aspect of the invention there is provided a storage battery housing for hindering the theft of a storage battery from a motor vehicle. The battery housing is provided with means for securing the bottom section of the housing to a mounting structure in such a manner that the storage battery cannot be detached from the mounting structure which may extend from the vehicle frame unless the vehicle is lifted up a sufficient distance from the ground so that a person can fit under the vehicle and disassemble the securing means from the underside of the vehicle.

In one embodiment, the battery housing has threaded studs molded or screwed into its underside and extending therefrom. The studs pass through holes in the mounting structure, and the battery is fastened thereto by nuts which are screwed on to the studs from the underside of the mounting structure.

In another embodiment, the battery housing has holes which extend from the top through the bottom thereof. Non-rotating type bolts are placed within these holes in the battery housing, and pass through aligned holes in the vehicle mounting structure. Nuts are screwed on to these bolts from the underside of and flush with the vehicle mounting structure, thus securing the battery to its mounting structure.

In still another embodiment, the battery housing has two molded edges extending from two opposite sides of its bottom surface. A rigid hold down plate having rigid formed edges is snugly fit under the bottom surface and surrounding the molded edges of the battery housing. The hold down plate has bolts or studs fastened to and extending from the bottom of the hold down plate. The battery together with the hold down plate are placed against the vehicle mounting structure, so that the bolts or studs are aligned with and pass through the holes in the mounting structure. The battery is again secured to the vehicle mounting structure by tightening the nuts on to the bolts or studs from the underside of the mounting structure.

BRIEF DESCRIPTION OF THE DRAWINGS

In the accompanying drawings, in which are shown various possible embodiments of my invention.

DESCRIPTION OF THE PREFERRED EMBODIMENTS

The invention will now be explained with reference to the various embodiments of the invention as shown in FIGS. 1 to 7.

In each of the embodiments of FIGS. 1 to 7, a storage battery housing 10, which is the external component and encases the elements of a storage battery, is secured to a battery mounting structure 11 in such a manner that the battery cannot be removed from a vehicle 12 by tampering with battery housing 10 within a motor compartment 13. Mounting structure 11 may be attached to and extends from the vehicle frame or bumper housing. In these embodiments, the means for detachably securing the battery housing to and from the mounting structure is only accessible from the underside of the mounting structure so that, in effect, the vehicle actually has to be lifted off the ground so that the securing means are only accessible from the underside of the vehicle.

Figure 1:
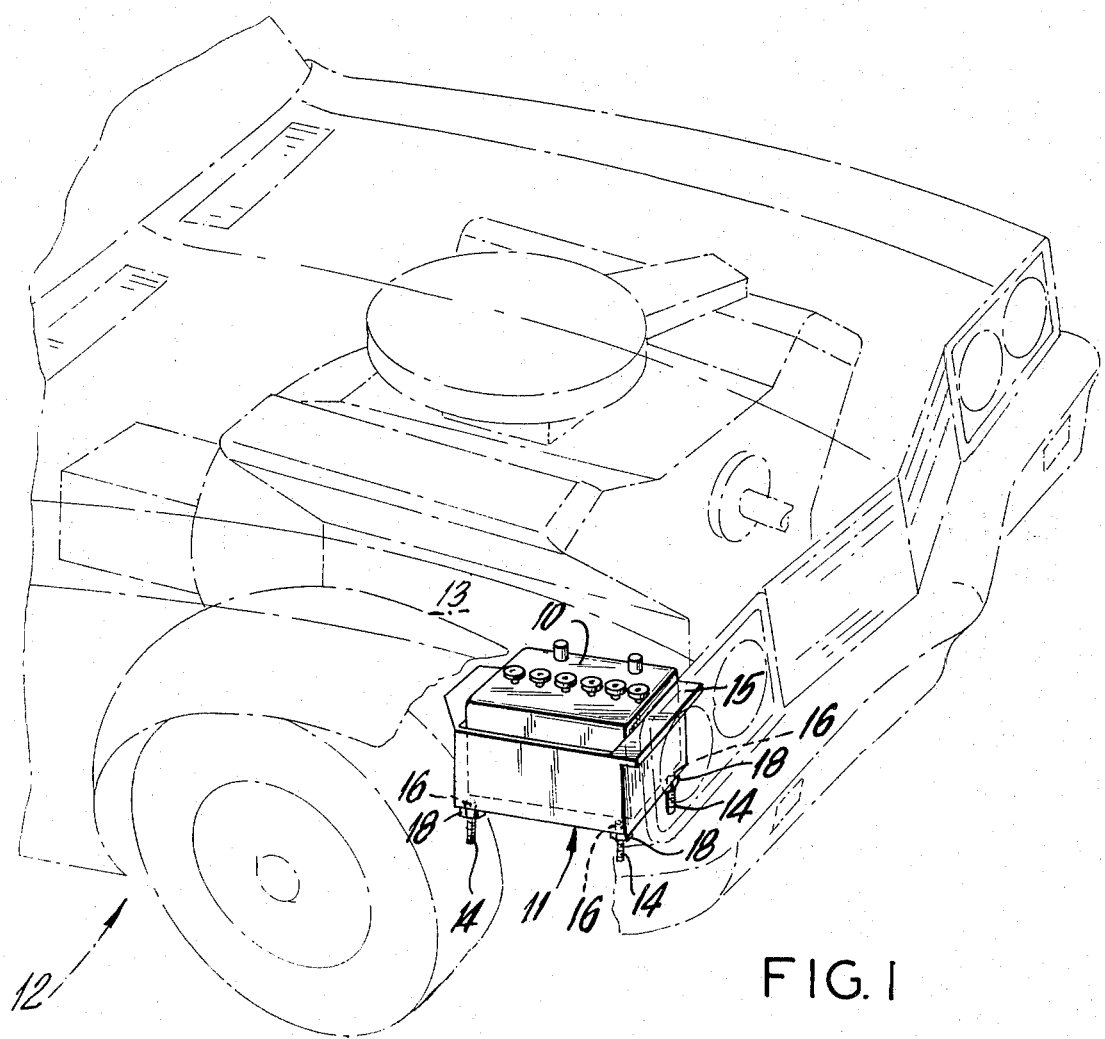
FIG. 1 is a partial perspective view of one embodiment of the invention showing a battery housing within a motor compartment of a vehicle, wherein studs are molded into the battery case and extend from the bottom thereof.

According to one embodiment of the invention, as shown in FIG. 1, storage battery housing 10 can have threaded studs or bolts 14 molded into or screwed into threaded holes within the bottom of battery 10, wherein the bolts extend downward therefrom. The battery housing can be placed into a battery holding receptacle case 15, which in this instance is formed by four walls extending from mounting structure 11. Mounting structure 11 has holes 16 therein which will align with the studs extending from the bottom of battery housing 10. Nuts 18 can then be screwed onto the end of each of studs or bolts 14 until the nuts are tight against the underside of the mounting structure. Since the underside of the mounting structure is accessible only from beneath the vehicle, and the vehicle frame is low slung, battery housing 10 can only be secured to and removed from the vehicle frame by, in effect, lifting the vehicle off the ground so that nuts 18 can be placed onto or removed from studs or bolts 14 from the underside of the vehicle.

Figure 2:
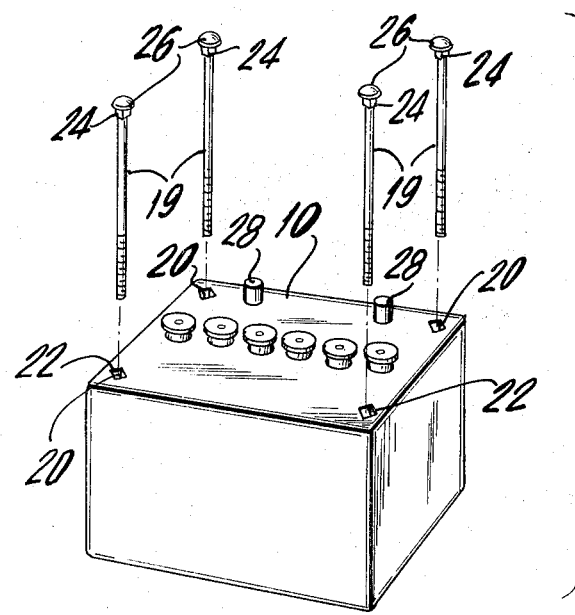
FIG. 2 shows another embodiment of the invention wherein non-rotating bolts pass through the battery housing.

In another embodiment of the invention, as shown in FIG. 2, non-rotatable bolts 19 can be placed through holes 20 in battery housing 10. The top portion 22 of holes 20 may have a square, or other type polygonal shape for receiving similar square, or other type polygonally shaped portions 24 of bolts 19, wherein portions 24 are adjacent the oval shaped head 26 of bolts 19. Portions 22 and 24 insure that bolts 19 do not rotate within holes 20. Bolts 19 extend through the holes in the mounting structure as shown in FIG. 1, and the battery housing is secured to the mounting structure in the identical fashion as previously explained with reference to FIG. 1.

Figure 3:
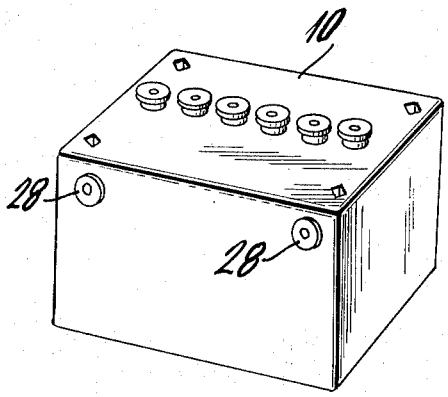
FIG. 3 shows the same battery housing as shown in FIG. 2, except that this battery housing has posts located on its side rather than on its top as shown in FIG. 2.

The embodiment shown in FIG. 3 is virtually identical to the embodiment shown in FIG. 2 with the exception that the battery housing in FIG. 3 has its terminal posts 28 extending from a side thereof, which posts do not interfere with the means for securing the battery housing to the mounting structure. (In FIG. 2 terminal posts 28 extend from the top of the battery housing).

Figure 4:
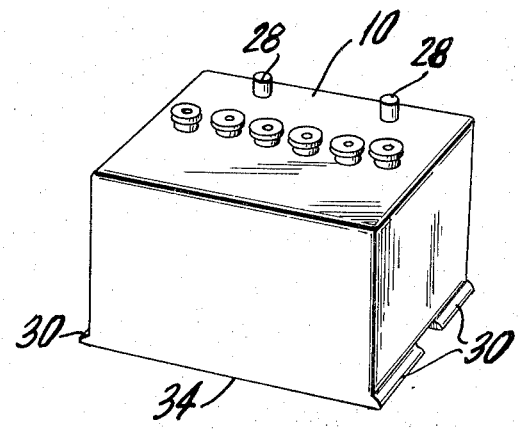
FIG. 4 shows another embodiment of the invention wherein the battery housing has a molded edge extending along the bottom of both sides thereof.

In accordance with another embodiment of the invention, as shown in FIG. 4, battery housing 10 can have two molded edges 30 extending from two opposite sides of the bottom surface thereof. Each molded edge may extend completely across one side of battery housing 10 or may have a separation in the middle as depicted in FIG. 4 if so desired.

Figure 5:
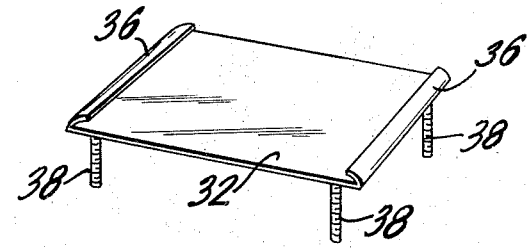
FIG. 5 shows a hold down plate used in conjunction with the battery housing shown in FIG. 4.

When installing this type of battery, a battery hold down plate 32, as shown in FIG. 5, is affixed to the underside 34 of battery housing 10 so that formed edges 36 of hold down plate 32 fit around and over molded edges 30 of battery housing 10 so that hold down plate 32 is snug fit to battery housing 10.

In the embodiment shown in FIG. 5, hold down plate 32 may have threaded studs 38 securely attached to the bottom thereof, and hold down plate 32 and battery housing 10, which is attached thereto, may be placed into battery holding receptacle 15, shown in FIG. 1, so that studs 38 pass through holes 16 in the mounting structure 11. Battery housing 10 and its attached hold down plate 32 are then fastened to the mounting structure in the same manner as described with respect to FIG. 1.

Figure 6:
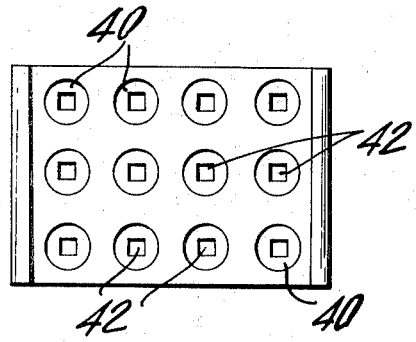
FIG. 6 is a top view of another embodiment of the hold down plate shown in FIG. 5.
Figure 7:
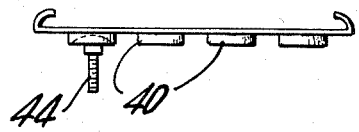
FIG. 7 is a front view of the hold down plate shown in FIG. 6.

FIGS. 6 and 7 show another embodiment of the hold down plate shown in FIG. 5. In this embodiment the hold down plate can have a plurality of round extrusions 40, and square or other shaped holes 42 formed at the base of extrusions 40, so as to receive non-rotatable bolts as described with reference to FIG. 2. Any number of suitable bolts 44 can be placed within extrusions 40 and square holes 42. Again, of course, battery housing 10 and its affixed hold down plate would be secured to the mounting structure in the manner previously described with reference to FIG. 1.

Although four hold down bolts and nuts are shown as exemplary of this installation, at least one or more bolts and nuts could be satisfactorily used in place thereof.

It should be noted that while storage battery housing 10 is shown placed in holding receptacle 15, storage battery housing 10 may alternatively be placed simply on mounting structure 11 having holes 16 therein for receiving studs or bolts 14 which extend from the bottom of battery housing 10.

It thus is seen that there is provided a storage battery housing for hindering the theft of storage batteries from motor vehicles, which achieves the several objects of the invention and is well adapted to meet the conditions of practical use.

As various possible embodiments might be made of the above invention, and as various changes might be made in the embodiments above set forth, it is to be understood that all matter herein described, or shown in the accompanying drawings, is to be interpreted as illustrative and not in a limiting sense.

Having now described the invention, there is claimed as new and is desired to be secured by Letters Patent:

1. Apparatus for preventing the theft of a storage battery from a motor compartment of a motor vehicle, said compartment being supported by a vehicle frame, comprising a storage battery housing containing all elements of said battery, a mounting structure mechanically coupled to said frame, said mounting structure having a first upper surface for receiving said battery housing, said mounting structure having at least one hole extending from said first surface to a second lower surface thereof, first and second molded sections, each section extending from opposite bottom edges of said battery housing, a rigid flat battery hold down plate having first and second formed portions at opposite ends thereof, each of said formed portions fitting over a different one of said molded sections to secure said hold down plate to the underside of said battery housing, said hold down plate having at least one bolt extending from the bottom thereof and through said hole in said mounting structure, means adjacent said mounting structure second surface for selectively locking said bolt.

2. Apparatus according to claim 1 wherein said hold down plate includes at least one hole, said hole being square shaped, said bolt having an oval head and a square portion abutting said oval head, the square portion of said bolt fitting into the square shaped hole to prevent said bolt from turning.

3. A method of removably securing a storage battery housing containing a battery to a mounting structure within a motor compartment of a motor vehicle wherein said battery housing includes first and second molded sections extending from opposite bottom edges thereof, comprising the steps of placing a rigid flat hold down plate on the underside of said battery housing, said hold down plate having formed portions for fitting around and over the respective molded sections of said battery housing to secure said hold down plate to said battery housing, said hold down plate having a stud associated with and extending from the bottom thereof, placing said hold down plate on to the first surface of a mounting structure and passing said stud through a hole in said mounting structure, screwing a nut on to said stud adjacent a second surface of the mounting structure until said nut is snugly fit against the second surface of said mounting structure whereby said nut is only accessible from the underside of the mounting structure.

4. Apparatus for protecting against the theft of a storage battery from a motor vehicle compartment of a motor vehicle comprising a motor vehicle, said motor vehicle including a motor compartment and a motor vehicle frame, a motor vehicle storage battery housing containing all elements of said storage battery, a mounting structure mechanically coupled to said motor vehicle frame and including an upper surface and a lower surface, said mounting structure positioned so that access to said lower surface is obtainable only from the underside of the motor vehicle, said mounting structure having at least one hole extending from the upper surface to the lower surface, a threaded rod secured to said motor vehicle storage battery housing, means for preventing said threaded rod from rotating, said threaded rod extending through said hole and a nut adjacent the mounting structure lower surface in engagement with said threaded rod.

* * * * *